(12) United States Patent
Weiberle et al.

(10) Patent No.: US 7,716,524 B2
(45) Date of Patent: *May 11, 2010

(54) RESTARTING AN ERRORED OBJECT OF A FIRST CLASS

(75) Inventors: Reinhard Weiberle, Vaihingen/Enz (DE); Bernd Mueller, Gerlingen (DE); Werner Harter, Illingen (DE); Ralf Angerbauer, Schwieberdingen (DE); Thomas Kottke, Ehningen (DE); Yorck von Collani, Beilstein (DE); Rainer Gmehlich, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 134 days.

This patent is subject to a terminal disclaimer.

(21) Appl. No.: 11/666,097

(22) PCT Filed: Oct. 20, 2005

(86) PCT No.: PCT/EP2005/055437

§ 371 (c)(1), (2), (4) Date: Apr. 3, 2008

(87) PCT Pub. No.: WO2006/045754

PCT Pub. Date: May 4, 2006

(65) Prior Publication Data

US 2009/0031161 A1    Jan. 29, 2009

(30) Foreign Application Priority Data

Oct. 25, 2004    (DE) ...................... 10 2004 051 966

(51) Int. Cl.
  *G06F 11/00*    (2006.01)

(52) U.S. Cl. .......................................... 714/16; 714/17
(58) Field of Classification Search .................. 714/16, 714/17
See application file for complete search history.

(56) References Cited

U.S. PATENT DOCUMENTS 3,248,697 A * 4/1966 Montgomery ................ 714/17

(Continued)

FOREIGN PATENT DOCUMENTS

EP    1 077 410    2/2001

(Continued)

OTHER PUBLICATIONS

Liu J. W. s. et al., "Imprecise Computations," Jan. 1994, pp. 83-93, Proceedings of the IEEE.

(Continued)

*Primary Examiner*—Gabriel L Chu
(74) *Attorney, Agent, or Firm*—Kenyon & Kenyon LLP

(57) ABSTRACT

A method for executing a computer program on computing hardware, e.g., on a microprocessor, is provided, the computer program including multiple program objects and errors being detected in the method while running the computer program on the computing hardware. The program objects are subdivided into at least two classes, and multiple program objects are executed during one run, program objects of the first class being repeated when an error is detected and, when an error is detected in one program object of the first class, which has already been sent for execution, this program object of the first class is restarted instead of a program object of the second class after the other program objects of the first class of a run.

20 Claims, 3 Drawing Sheets

U.S. PATENT DOCUMENTS

| | | | | |
|---|---|---|---|---|
| 5,138,708 | A | * | 8/1992 | Vosbury ...................... 714/11 |
| 5,269,017 | A | * | 12/1993 | Hayden et al. ................ 714/15 |
| 5,530,802 | A | * | 6/1996 | Fuchs et al. ................... 714/17 |
| 5,815,651 | A | * | 9/1998 | Litt ............................. 714/10 |
| 6,205,542 | B1 | * | 3/2001 | Grochowski et al. ........ 712/219 |
| 2004/0064756 | A1 | * | 4/2004 | Kadambi ..................... 714/17 |
| 2005/0251703 | A1 | * | 11/2005 | Liardet et al. ................ 714/17 |

FOREIGN PATENT DOCUMENTS

| | | |
|---|---|---|
| EP | 1 121 642 | 2/2003 |
| WO | WO 00/22529 | 4/2000 |

OTHER PUBLICATIONS

Ramos-Thuel S. et al., "The Transient Server Approach to Scheduling Time-Critical Recovery Operations," Dec. 1991, pp. 286-295, IEEE Computer Society.

* cited by examiner

RESTARTING AN ERRORED OBJECT OF A FIRST CLASS

BACKGROUND OF THE INVENTION

1. Field of the Invention

The present invention relates to a method for executing a computer program on computing hardware, e.g., on a microprocessor, which computer program includes multiple program objects, in which method errors are detected during the running of the computer program on the computing hardware. The present invention also relates to an operating system capable of running on computing hardware, e.g., on a microprocessor. The present invention also relates to a computing hardware for running a computer program including multiple program objects, which computing hardware has an error detection mechanism for detecting an error during the running of the computer program on the computing hardware.

2. Description of Related Art

So-called transient errors may occur in running a computer program on computing hardware. Since the structures on semiconductor modules (so-called chips) are becoming progressively smaller, but the clock rates of the signals are becoming progressively higher and the signal voltages are becoming progressively lower, there is an increased incidence of transient errors. Transient errors occur only temporarily, in contrast with permanent errors, and usually disappear spontaneously after a period of time. In transient errors, only individual bits are faulty and there is no permanent damage to the computing hardware. Transient errors may have various causes such as electromagnetic influences, alpha-particles or neutrons.

The emphasis in error handling in communications systems is even presently on transient errors. It is known that when an error is detected in communications systems (e.g., in a controller area network, CAN), the erroneously transmitted data are resent. Furthermore, the use of an error counter is known in communications systems, which is incremented on detection of an error, is decremented when there is a correct transmission, and prevents transmission of data as soon as it exceeds a certain value.

In the case of computing hardware for running computer programs, however, error handling is performed essentially only for permanent errors. Taking transient errors into account is limited to incrementing and, if necessary, decrementing an error counter. This counter reading is stored in a memory and may be read out off-line, i.e., as diagnostic or error information during a visit to a repair shop, e.g., in the case of computing hardware designed as a vehicle control unit. Only then is it possible to respond appropriately to the error.

Error handling via error counters thus, on the one hand, does not allow error handling within a short error tolerance time, which is necessary in particular for safety-relevant systems, and also, on the other hand, does not allow constructive error handling in the sense that the computer program is being run again properly within the error tolerance time. Instead, in the related art, the computer program is switched to emergency operation after exceeding a certain value on the error counter. This means that a different part of the computer program is run instead of the part containing the error, and the substitute values determined in this way are used for further computation. The substitute values may be modeled on the basis of other quantities, for example. Alternatively, the results calculated using the part of the computer program containing the error may be discarded as defective and replaced by standard values that are provided for emergency operation for further calculation. The known methods for handling a transient error of a computer program running on computing hardware thus do not allow any systematic constructive handling of the transient nature of most errors.

It is also known in the art that transient errors occurring in running a computer program on computing hardware may be eliminated by completely restarting the computing hardware. This approach is also not actually satisfactory, because quantities obtained in processing of the computer program to that point are lost and the computing hardware is unable to fulfill its intended function for the duration of the restart. This is unacceptable in the case of safety-relevant systems in particular.

Finally, it is also known that, for error handling for transient errors of a computer program run on computing hardware, the computer program may be set back by a few clock pulses and individual machine instructions of the computer program may be repeated. This method is also known as micro-rollback. With the known method, the system only returns by objects on a machine level (clock pulses, machine instructions). This requires appropriate hardware support on a machine level, which is associated with a considerable complexity in the area of the computing hardware. It is impossible for the known method to be executed exclusively under software control.

The error handling mechanisms known in the art are unable to respond in a suitable manner to transient errors occurring in running a computer program on computing hardware.

However, transient errors are especially frequent in future technologies. If they are detected, e.g., via dual core mechanisms, the question of error localization still remains to be answered in order to identify the correct result. This is true even more so if one has the goal that a transient error does not always result in restarting the computer. As described, error localization can typically only be achieved via comparatively complex methods.

BRIEF SUMMARY OF THE INVENTION

An object of the present invention is to provide a constructive means of handling transient errors in running a computer program on computing hardware in such a way that the full functionality and functional reliability of the computer system are restored within the shortest possible error tolerance time.

To achieve this object, when an error is detected, at least one program object that has already been sent for execution is set to a defined state and started up again from this state.

On a system level, the question nevertheless remains how to sensibly implement such a concept of task repetition. As a rule, it is not the case that any erroneous task can simply be re-computed since the additionally required computing time and also the point in time used therefor are planned from the system viewpoint to be used differently. If the workload of the processor is already close to 100% (and this is generally the case), such an unscheduled additional load (which a task repetition represents) generates a system overload which typically may result in a crash. This is even more pronounced when time-controlled systems are considered (which; as it becomes apparent, will prevail at least to some extent). A deadline violation is not tolerable in these systems, just as little as in most of the other hard real-time concepts.

From the system viewpoint, the consequence arises that the additional load, which may result from a potential task repetition, must be scheduled. If the computing time needed for a task repetition is reserved after each task, then this may certainly work; however, 100% additional performance must be paid for compared to a system which does not handle errors. This is unacceptable from the cost point of view.

Furthermore, it is an object of the present invention to provide an optimum system strategy, which does not always schedule the double computation of a task (thus generating a permanent and very large overhead), and which at the same time solves the issue of how to combine that with time-controlled approaches.

In accordance with the present invention, a method, an operating system, and computing hardware are provided within the scope of a system strategy, which make it possible to integrate the concept of task repetition with a minimum of, or even without any, performance overhead. Such a system strategy is an ancillary condition for scheduling methods of tasks, functions, programs, or program parts which are referred to in the following as a program object or program objects in particular.

It is not necessary for the program object that is restarted to have been executed completely on detection of the error. In the sense of the present invention, program objects whose execution has already begun but is not yet complete at the point in time of error detection may also be restarted when an error occurs. According to the present invention, when a transient or permanent error occurs, at least one operating system object is executed again. The advantages compared to the micro-rollback include in particular the fact that repetition of a program object is implementable using very little hardware support. At most, additional memory capacity is needed to be able to store some information (e.g., input quantities of the program object) required for renewed execution of the program object. The actual administration of the method according to the present invention may be performed by the operating system of the computing hardware. In other words, the method according to the present invention is implementable using traditional commercial processors without requiring additional hardware. However, it is of course also possible to implement the method according to the present invention by using hardware support.

Compared to the prior art, it is thus more favorable to re-compute the erroneous task, i.e., the erroneous function or the erroneous program or program part or program object, or at least the operating system object. If the error was originally transient, the two outputs are equal in a re-computation, i.e., the error has disappeared and it was handled by re-computing.

A method for running a computer program on computing hardware, on a microprocessor in particular, is advantageously described, the computer program including multiple program objects and errors being detected while running the computer program on the computing hardware using the method, the program objects being subdivided into at least two classes and multiple program objects being executed in one run, program objects of the first class being repeated when an error is detected and, when an error is detected in one program object of the first class, which has already been sent for execution, this program object of the first class being restarted instead of a program object of the second class after the other program objects of the first class of a run.

For this purpose, the detection of an error is performed only in classes which are restarted.

Error detection itself may be accomplished by any method. It is conceivable to use any type of error detection mechanism capable of detecting errors during running of a computer program (known as concurrent checking). In a dual-core architecture, for example, the entire computer core may be designed in duplicate. If the computer cores are operated in a lock-step mode, it is possible to determine by comparison for each instruction whether both computer cores are supplying the same result. A difference in results would then definitely indicate an error. This error detection mechanism thus detects errors in real time during the execution of program objects. The situation is similar with error detecting codes which are used throughout the processor architecture or with duplicated subcomponents of the computing hardware. All these error detection mechanisms have in common the fact that they detect transient errors very rapidly and supply an error signal when an error has been detected.

In response to such an error signal, an error handling mechanism that repeats the program object may be triggered. If the same error occurs again when execution is repeated, a permanent error may be inferred or an error counter may be incremented, a permanent error being inferred only when a certain value is exceeded. However, if the error no longer occurs in renewed execution of the program object, it may be assumed that the error was a transient error. Even during renewed error-free execution of the program object, the computer program is again ready for its intended function. Availability is thus restored again after a very short period of time. Repetition of at least one program object is thus a good means for handling transient errors.

According to an example embodiment of the present invention, the program objects are configured as runtime objects (hereinafter specifically referred to as tasks) of the computer program, at least one task being executed again on detection of an error. A task is a typical object in particular on the operating system level. A task may be repeated with minimal effort or even under the exclusive control of the software, if desired.

According to an example embodiment of the present invention, a program object, which is executed at the point in time of the detection of the error, is restarted. Alternatively or additionally, however, program objects that had already been executed completely at the point in time of the detection of the error may also be restarted and executed again.

According to the present invention, during execution of the program objects, e.g., at the start of execution of the program objects, at least one defined status of the program objects is generated and saved. This may be accomplished, for example, by saving the values of all variables relevant for the status of the program object.

In addition, another piece of computing hardware, operating as a redundant system to the computing hardware on which the computer program having the multiple program objects is executed, is used for error detection. More than one piece of redundant computing hardware may of course also be used for error detection.

The method according to the present invention may be used in a motor vehicle, e.g., in a motor vehicle control unit, to ensure a secure and reliable run of the computer program despite unavoidable transient errors in running a computer program. This is important in particular in running control programs and/or regulating programs in safety-critical applications in a motor vehicle.

It is also provided that a permanent error be inferred if the same error occurs again in renewed execution of the at least one program object. It is also conceivable for a permanent error to be inferred only when the error occurs repeatedly after a preselectable number of repetitions of the program object. In this case, a transient error is inferred even if it fails to occur only after a third repetition or an even later repetition of the program object. In this refinement of the present invention, important program objects may thus be repeated, for example, three times instead of only twice.

According to another example embodiment of the present invention, the number of repetitions of the at least one program object is limited to a preselectable value. This prevents the same program object from being repeated indefinitely in the case of a permanent error. The number of repetitions of the at least one program object may be limited, for example, by using a counter or based on time limits. Furthermore, due to the specification of the task-dependent repetition value, important tasks are repeated more often than less important tasks and thus important tasks are given an opportunity more often and/or for a longer period of time to run error-free without transient errors, whereas a permanent error may be inferred relatively rapidly in the case of less important tasks, and another system response may be initiated.

According to another example embodiment of the present invention, the number of repetitions of the at least one program object is limited dynamically to a preselectable value. The number of repetitions of the at least one program object is advantageously limited dynamically to a preselectable value as a function of a remaining time for scheduling. In this way, a first task and a second task, for example, may be run through while a third task may be repeated several times.

To implement the method according to the present invention, during running of the computer program before the execution of a program object, the values of the quantities required for execution of the program object and/or the quantities that define the status of the program object are saved. Thus, according to this specific embodiment, the quantities of all program objects are saved.

Alternatively, in the case of a computer program to be processed periodically in a period, on detection of an error in a certain program object, the processing jumps back to a preselectable return point in the period of the computer program. Thus, according to this example embodiment, in the case of an error, the program always jumps back to the same point within the period. Then the values of all quantities relevant for the status of the program object may be saved during running of the computer program only before the execution of a program object at the return point. In this way, only the values of the relevant quantities of the program object at the return point need be stored only once per cycle or period. Therefore, this allows savings in time for storing and memory capacity.

In renewed execution of a program object after detection of an error, the saved input quantities are then retrieved and made available as input quantities to the program object to be executed again.

As another example embodiment of the present invention, multiple return points may be provided for one program object. When an error occurs, it is not necessary to execute the entire program object again, but instead only a portion of the program object need be executed. When an error occurs, the execution simply jumps back to the previous return point up to which the execution of the program object was free of errors. For example, in error-free running of the program object up to the n-th return point, it is possible to return to the n-th return point when an error occurs between the n-th return point and the (n+1)-th return point. The program object is then executed anew starting with the n-th return point. This permits time savings. When each return point is passed, at least one defined state is generated and saved, preferably during the execution of the program object.

Implementation of the method according to the present invention in the form of an operating system is of particular importance. The operating system here is capable of running on computing hardware, e.g., on a microprocessor, and is programmed for execution of the method according to the present invention when it is running on the computing hardware. In this case, the present invention is thus implemented by the operating system. The operating system may be stored in a memory element and is transmitted to the computing hardware for processing. Any data medium or an electronic memory medium may be used as the memory element, e.g., a random access memory (RAM), a read-only memory (ROM) or a flash memory.

Another means of achieving the object of the present invention is for the computing hardware to have an error handling mechanism which prompts renewed execution of at least one program object on detection of an error by the error detection mechanism.

According to an advantageous example embodiment of the present invention, the error handling mechanism has a trigger logic which restarts the at least one program object on detection of an error.

According to an example embodiment, a real-time operating system, e.g., OSEK time, is running on the computing hardware. Finally, the present invention provides for the computing hardware to include a microprocessor.

DETAILED DESCRIPTION OF THE INVENTION

In a method for running a computer program on computing hardware, e.g., on a microprocessor, which computer program includes a plurality of program objects configured as tasks, errors are detected during the running of the computer program on the computing hardware, which detected errors may be transient or permanent.

Transient errors may occur in running a computer program on computing hardware. Since structures on the semiconductor modules (known as chips) in computing hardware are becoming progressively smaller, but the clock rate of the signals are becoming progressively higher and the signal voltages progressively lower, transient errors are occurring with ever greater frequency in running a computer program on computing hardware. In contrast with permanent errors, they occur only temporarily and they usually disappear spontaneously after a period of time. In transient errors, only individual bits are faulty and there is no permanent damage to the computing hardware. Transient errors may have various causes, e.g., electromagnetic effects, alpha-particles or neutrons.

On the basis of the fact that transient errors occur almost unforeseeably and therefore are not reproducible, error handling is therefore performed essentially only for permanent errors in the computing hardware known in the art. Taking into account transient errors is limited to incrementation and, possibly, decrementation of an error counter. This count is stored in a memory and may be read out off-line, i.e., as diagnostic information or error information during a visit to the repair shop, for example. Only then is it possible to respond appropriately to the error. The known error handling thus does not allow any error handling within a short error tolerance time, which is necessary for safety-relevant systems in particular and also does not allow constructive error handling in the sense that the computer program resumes proper processing within the error tolerance time and the computing hardware is able to fulfill its intended purpose.

Figure 1:
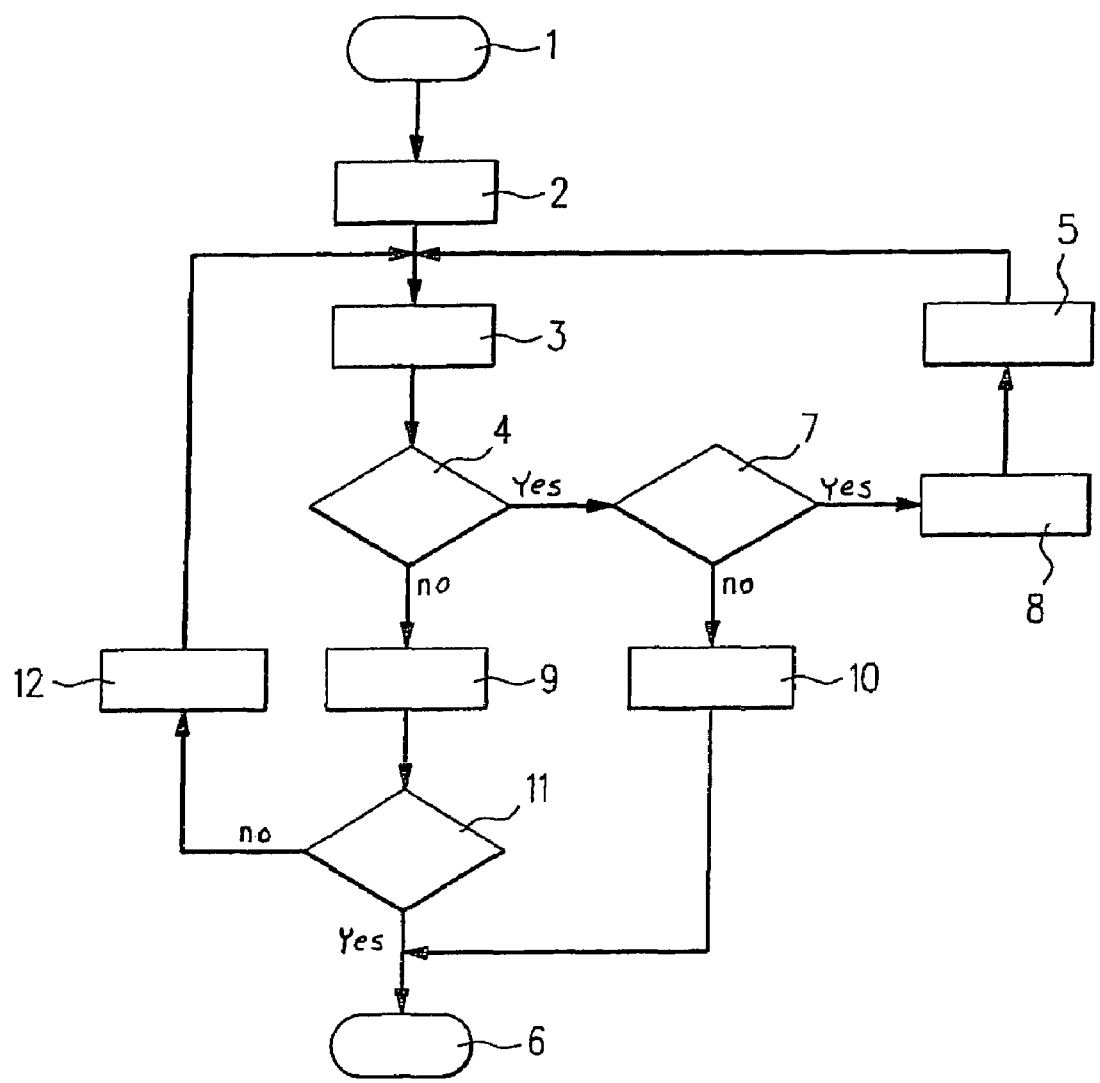
FIG. 1 shows a flow chart of an example method according to the present invention.

In contrast, the method according to the present invention allows handling of a transient error of a computer program running on computing hardware using a systematic constructive means of handling the transient nature of most errors. FIG. 1 shows a flow chart of the method according to the present invention using the example of a runtime object, also called a task. The existence of other tasks does not affect the basic workflow, so they need not be taken into account. Thus according to the present invention, multiple tasks may be handled just as one task is handled according to the workflow depicted in FIG. 1. An error detection mechanism (so-called concurrent checking) operating in parallel is particularly advantageous. However, this is not presentable in a flow chart in this way but instead is inserted as a serial module at the particular location.

The method according to the present invention begins in a function block 1. The execution of the task on the computing hardware starts in function block 1. The task is called. In a function block 2, a return point is generated. To this end, reliable relevant task input quantities sufficient for setting the task in a defined state for a restart and restarting the task are saved in a memory element in the computing hardware. All the input quantities of the task are preferably saved. The task is then executed further in a function block 3. The execution may proceed either to another return point or to the end of the task. An error detection mechanism is then executed. Error detection may occur according to any method. Errors are detected during the running of the computer program (known as concurrent checking). Thus, with a so-called dual-core architecture, for example, the entire computer core is designed in duplicate. If the computer cores are operated in a so-called lock-step mode, it is possible to compare whether both computer cores deliver the same results for each instruction. A difference in results then allows an error to be inferred with certainty. Such an error detection mechanism thus detects errors during execution of the task in real time. The situation is also similar for error detecting codes which are used throughout the processor architecture or even for duplicated subcomponents of the computing hardware. Such error detection mechanisms that detect transient errors very rapidly and supply an error signal when an error has been detected are appropriate.

A query block 4 checks on whether an error, i.e., a transient error or a permanent error, has been detected. If an error has been detected, another query block 7 branches off where the current value of an error counter logic is checked. If the error counter has not yet fallen below a preselectable counter reading (in the case of a decrementing error counter) or exceeded it (in the case of an incrementing error counter), then it is possible to repeat the execution of the task during the execution of which the error has occurred and/or a certain number of tasks executed before the error occurred. If a renewed startup of the execution of the task is possible, then the system branches off into a function block 8, where the status of the error counter logic is updated (decremented or incremented) with the information that another error has occurred. From there, the system branches off into a function block 5, in which the quantities stored in function block 2 are loaded and sent to the task for generating a defined status at the beginning of the execution. The system then branches off into a function block 3, where the task to be repeated is executed again in part, i.e., starting from a return point that has already been executed, for example, or as a whole, i.e., the task is restarted from the beginning.

If it is found in query block 4 that no error has occurred during execution of the task in function block 3, then the system branches off into a function block 9 in which the status of the error counter logic is updated with the information that no error has been detected. From that point forward, the system branches off into a query block 11 which verifies whether the computer program has been run to the end. If this is the case, then the system branches off to the end of the computer program in function block 6. Otherwise it branches off into a function block 12, where another return point is generated, depending on the current task status, by defining and saving reliable relevant task input quantities sufficient for restarting the task. From that point forward, the system branches back into function block 3, where the task to be repeated is restarted and executed again either in part or in its entirety.

If it is found in query block 7 that another attempt at renewed execution of the task is no longer possible because of the reading on the error counter logic, then the system branches off into a function block 10. Query block 7 verifies whether the error counter logic value for this task is greater than a task-dependent repetition value. This task-dependent repetition value may be predetermined either as the same for different tasks or individually for each task. It is possible in this way for particularly important tasks, for example, to first be repeated several times before a permanent error is reported. If the task-dependent repetition value is preselected as 1, the task is repeated only once before a permanent error is detected. If the task-dependent repetition value is preselected as 2 or 3, the task is repeated two or three times before a permanent error is detected. In this case, the task thus has a longer period of time or more run-throughs available, until the transient error no longer occurs. In function block 10, a permanent error is then detected and a corresponding measure is initiated. This measure may include, for example, setting the computer program to an emergency mode or initially not undertaking anything and then terminating the run of the computer program.

The method according to the present invention need not necessarily include all the function blocks and query blocks shown in FIG. 1 and explained above. Thus, for example, blocks 7 through 9, which involve the error counter logic, may be omitted. On detection of an error, the task(s) to be restarted and executed would then be repeated until the error no longer occurs. A permanent error would not be detected, so function block 10 could also be omitted. Alternatively, the task-dependent repetition value may be preselected as 1, so that function blocks 8 and 9 for updating the error counter could be omitted. Finally, it is also possible to omit blocks 11 and 12 if only a single task having a single return point is executed.

Figure 2:
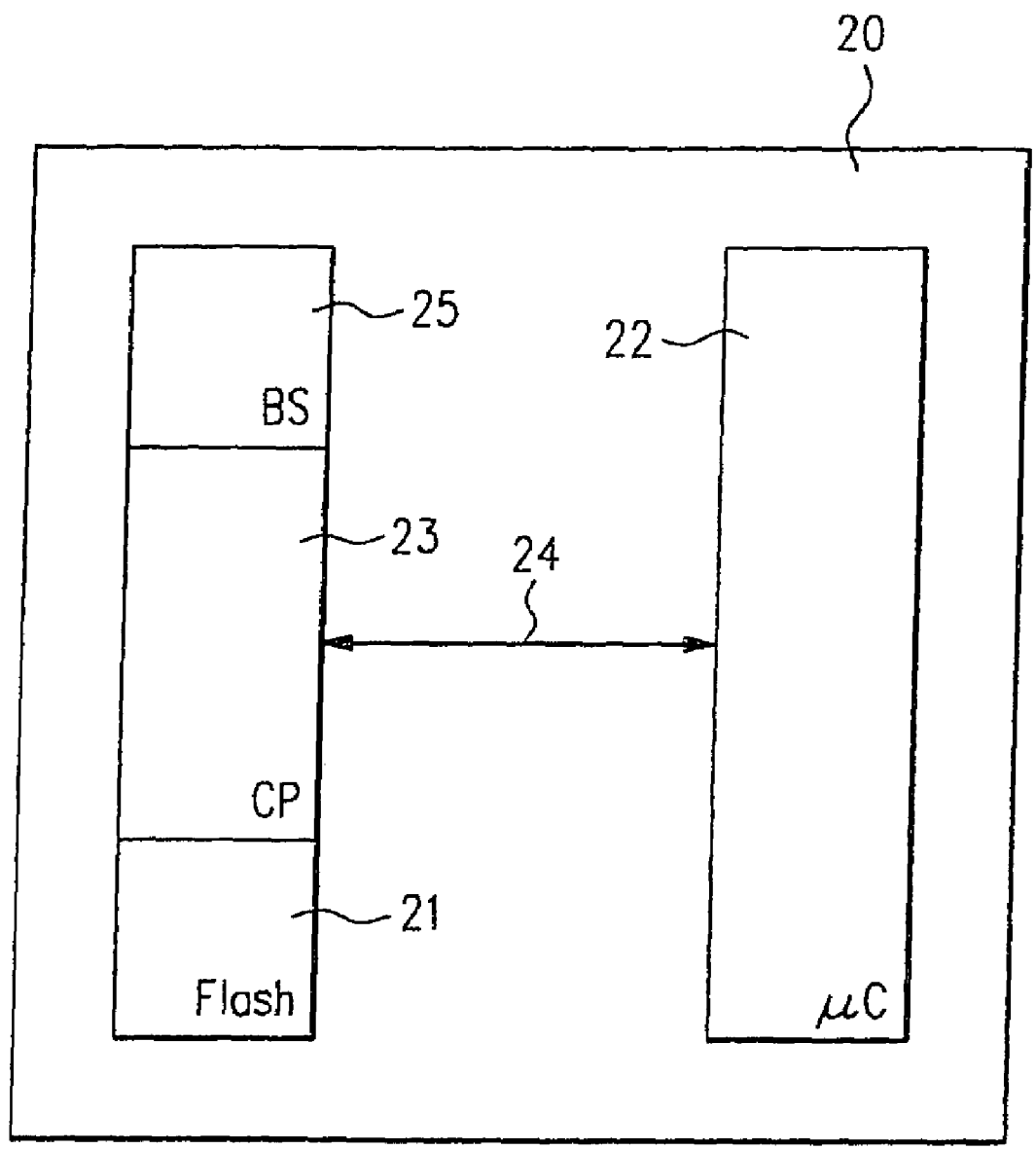
FIG. 2 shows a schematic diagram of an example embodiment of a computing hardware according to the present invention.

FIG. 2 shows a piece of computing hardware according to the present invention for running a computer program according to an example embodiment. The computing hardware is labeled as 20 in its entirety. The computing hardware includes a memory element 21, designed as an electronic memory, in particular a flash memory, for example. Furthermore, computing hardware 20 includes a microprocessor 22 on which a computer program may be run. The computer program is stored in electronic memory medium 21 and is labeled as 23. For running the computer program on microprocessor 22, the computer program is transmitted either as a whole or in segments, e.g., command by command to microprocessor 22 over a data link 24. Data link 24 may be designed as one or more data lines or as a bus system for data transmission. Furthermore, an operating system is stored in memory medium 21, which is transmitted at least partially from memory 21 to microprocessor 22 and run there when computing hardware 20 is booted up. The operating system is labeled as 25. It has the function of controlling and managing the running of computer program 23 on microprocessor 22 and the peripheral equipment connected to computing hardware 20. According to the present invention, operating system 25 is designed in a particular manner, so it is programmed for executing the method according to the present invention and executes the method according to the present invention when it runs on microprocessor 22. In particular, operating system 25 includes access to an error detection mechanism for detecting an error during running of computer program 23 on microprocessor 22. Furthermore, operating system 25 includes an error handling mechanism which prompts renewed execution of at least one program object (one task) of computer program 23 on detection of an error.

A method, an operating system, and computing hardware are proposed within the scope of a system strategy according to the present invention which make it possible to integrate this concept of task repetition with a minimum of, or even without any, performance overhead.

It is based on a system strategy which minimizes the performance overhead and thus the costs for different assumptions. It is generally assumed that an error detection mechanism, in particular as described above, is available which is able to detect errors while the task is running (e.g., a dual core mechanism, having redundant processing). Furthermore, especially transient errors are discussed here. In order to cover permanent errors, an extension is necessary, e.g., an error counter as mentioned above.

Several preconditions have to be observed in the strategy according to the present invention for integrating the task repetition as described in FIG. 3:

A distinction is made between at least two classes of tasks (e.g., critical and noncritical tasks). The error detection mechanisms are not used for all task classes and/or the task repetition is not carried out for all task classes.

In the example of FIG. 3, a distinction is made between two classes of tasks in which a task repetition is carried out for only one class and/or an error detection mechanism is started for only one class. When distinguishing between critical and noncritical tasks, only errors in critical tasks are intercepted according to the present invention; the error detection mechanism is used only for the first class in particular. Critical tasks are such tasks in which a correct execution is necessary for the overall function or the basic functionality of the system and must have taken place at a certain point in time at the latest in order to preserve this function. Noncritical tasks are such tasks in which the overall system function or also the basic function is either not affected or is not significantly restricted. In particular, in a system a distinction is made in this regard between safety-critical and non-safety-critical functions.

Transient errors in a task of the second class, i.e., noncritical class 2, may be ignored. Furthermore, as mentioned, it holds true that a task of the second class occasionally may not "get a turn" i.e., that there are no serious consequences from the perspective of the system when a task of this second class is not called up during a task processing run.

Figure 3A:
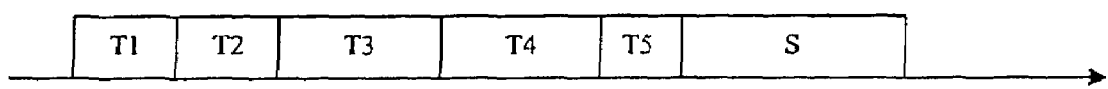
FIGS. 3a and 3b show an example method according to the present invention for integrating the task repetition.

In this instance, the system should be able to cope with slightly greater jitters (of the magnitude of a run). This should preferably run through the application and platform mechanisms, e.g., the operating system. FIG. 3a shows a run having tasks T1, T2, T3, T4, T5, and S in error-free execution.

Figure 3B:
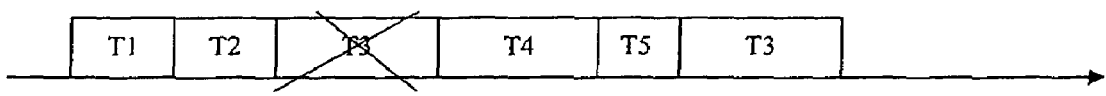

In FIG. 3 a distinction is made between class 1 tasks T1, T2, T3, T4, and T5 and class 2 tasks S. If a transient error occurs during T3, according to FIG. 3b T3 is computed again in time S after the other tasks of the first class and S is omitted completely or partially.

This means that there are at least two classes of tasks (e.g., critical T1 through T5 and noncritical S). Transient errors in a task of the second class may be ignored. Furthermore, it must hold true that a task of the second class occasionally may not "get a turn," i.e., that there are no serious consequences from the perspective of the system when a task of this class is not called up during a cycle or run. Finally, there must be at least one noncritical task per run which lasts as long as the longest of the critical tasks. This at least one noncritical task S may also be implemented as idle time.

If an error is detected in Ti, such as in T3 according to FIG. 3, for example, the result of Ti (T3) is declared irrelevant and, in contrast to the previous examples, the other tasks (T4, T5) are executed. After Tn (T5) is completed, Ti (T3) is computed again. A precondition is a system design which does not require that the results of tasks of one cycle are still (obligatorily) needed by other tasks of the same cycle, since the sequence of the tasks is not adhered to in this case.

This system approach is implemented according to the explanations in connection with FIGS. 1 and 2 using the corresponding device in such a way that, with regard to the disclosure, each example embodiment is explicitly combinable with any other according to the present invention.

In this manner, according to the present invention, an optimum FO characteristic (FO: fail operation(al), fault operation (al)) is achievable with regard to transient errors.

What is claimed is:

1. A method for executing a computer program on a computing hardware, comprising:
executing the computer program on the computing hardware and detecting errors during the execution, wherein the computer program includes a plurality of program objects, the program objects are subdivided into at least two classes, and multiple program objects are executed in one execution run; and
repeating a program object of a first one of the classes when an error is detected;
wherein:
when an error is detected in a program object of the first class that has already been sent for execution, said program object of the first class is restarted instead of a program object of a second one of the classes after other program objects of the first class in an execution run; and
the program objects of different classes are executed alternately.

2. The method as recited in claim 1, wherein error detection is performed only in classes which are restarted.

3. The method as recited in claim 1, wherein the program objects are configured as tasks of the computer program, and wherein at least one task is executed again when an error is detected.

4. The method as recited in claim 3, wherein a program object being executed at the point in time of the detection of the error is executed again.

5. The method as recited in claim 1, wherein at least one selected state of the program objects is defined and saved during the execution of the program objects.

6. The method as recited in claim 1, wherein the method is implemented in a motor vehicle control unit.

7. The method as recited in claim 1, wherein the values of quantities required for executing a selected program object are saved during running of the computer program, before execution of the selected program object.

8. The method as recited in claim 1, wherein, if the computer program is configured to be periodically executed with a predefined period, and if an error is detected in the computer program, the execution of the program returns to a selected program object at a preselected return point in the predefined period of the computer program.

9. A computer-readable medium having stored thereon an operating system configured to be executed on a computing hardware, wherein the operating system, when executed on the computing hardware, controls a method of executing a computer program on the computing hardware, the method comprising:

executing the computer program on the computing hardware and detecting errors during the execution, wherein the computer program includes a plurality of program objects, and wherein the program objects are subdivided into at least two classes, and wherein multiple program objects are executed in one execution run; and repeating a program object of a first one of the classes when an error is detected;

wherein:

when an error is detected in a program object of the first class that has already been sent for execution, said program object of the first class is restarted instead of a program object of a second one of the classes after other program objects of the first class in an execution run; and the program objects of different classes are executed alternately.

10. The computer-readable medium as recited in claim 9, wherein at least one selected state of the program objects is defined and saved during the execution of the program objects.

11. The computer-readable medium as recited in claim 9, wherein the program objects are configured as tasks of the computer program, and wherein at least one task is executed again when an error is detected.

12. The computer-readable medium as recited in claim 9, wherein values of quantities required for executing a selected program object are saved during running of the computer program, before execution of the selected program object.

13. The computer-readable medium as recited in claim 9, wherein a program object being executed at the point in time of the detection of the error is executed again.

14. A computing system for executing a computer program including a plurality of program objects, the computer program including a plurality of program objects that are subdivided into at least two classes, multiple ones of the program objects being executed in one execution run, the computing system comprising:

an error-detection mechanism configured to detect an error during execution of the computer program;

an error-handling mechanism configured to cause a program object of a first one of the classes to be repeated when an error is detected by the error-detection mechanism;

wherein:

when an error is detected in a program object of first class that has already been sent for execution, said program object of the first class is restarted instead of a program object of a second one of the classes after other program objects of the first class in an execution run; and the program objects of different classes are executed alternately.

15. The computing system as recited in claim 14, wherein the error-handling mechanism includes a trigger logic which restarts the at least one program object upon detection of an error.

16. The computing system as recited in claim 14, wherein a real-time operating system runs on the computing system.

17. The computing system as recited in claim 14, wherein at least one selected state of the program objects is defined and saved during the execution of the program objects.

18. The computing system as recited in claim 14, wherein the error-detection and error-handling mechanisms are implemented in a motor vehicle control unit.

19. The computing system as recited in claim 14, wherein values of quantities required for executing a selected program object are saved during running of the computer program, before execution of the selected program object.

20. The computing system as recited in claim 14, wherein the program objects are configured as tasks of the computer program, and wherein at least one task is executed again when an error is detected.

* * * * *